Aug. 3, 1948.  J. M. MILLER, JR  2,446,188
BRIDGE TYPE MODULATOR CIRCUIT
Filed March 11, 1946  2 Sheets-Sheet 1

Inventor
JOHN M. MILLER JR

By M. Hayes

Attorney

Aug. 3, 1948. J. M. MILLER, JR 2,446,188
BRIDGE TYPE MODULATOR CIRCUIT
Filed March 11, 1946 2 Sheets-Sheet 2

Inventor
JOHN M. MILLER JR.
By M. O. Hayes
Attorney

Patented Aug. 3, 1948

2,446,188

UNITED STATES PATENT OFFICE 2,446,188

BRIDGE TYPE MODULATOR CIRCUIT

John M. Miller, Jr., Torrington, Conn.

Application March 11, 1946, Serial No. 653,695

7 Claims. (Cl. 179—171.5)

(Granted under the act of March 3, 1883, as amended April 30, 1928; 370 O. G. 757)

My invention relates to a bridge circuit suited, for example, for use with or as a direct-current amplifier, a square-wave generator, a vacuum tube voltmeter, a zero-beat indicator, a modulator or a demodulator.

In accordance with my invention, an alternating voltage is impressed upon one pair of conjugate terminals of a bridge circuit at least one of whose balancing arms includes an asymmetric conductor and a source of direct-current is utilized to vary the magnitude of unbalanced alternating current traversing an output impedance in circuit between another pair of conjugate terminals of the bridge.

More particularly, in some forms of my invention, the bridge circuit includes asymmetric conductors or rectifiers so disposed and poled that the output arm of the bridge is traversed by alternating currents opposite in polarity and whose difference in magnitude is a function of the magnitude of a direct-current voltage introduced in the bridge relatively to vary the periods of conduction of the rectifiers.

In accordance with another form of my invention, one of the balancing arms of the bridge includes the anode-cathode resistance of a tube upon whose control electrode is impressed a direct-current voltage and/or an alternating current voltage to vary or control the unbalance of the bridge at the relatively higher frequency impressed as aforesaid on conjugate input terminals of the bridge.

My invention further resides in the methods and systems hereinafter described and claimed.

For an understanding of my invention and for illustration of various forms thereof, reference is made to the accompanying drawings in which.

High-gain direct-current amplifiers of conventional design are subject to many faults and complications such as need for stabilization of power-supply voltages to avoid what is termed "drift," the need for an individual power supply for each stage of the amplifier or alternatively a power supply having an output voltage sufficiently high to meet the requirements imposed by series connection of the tube circuits of the stages.

Figure 2:
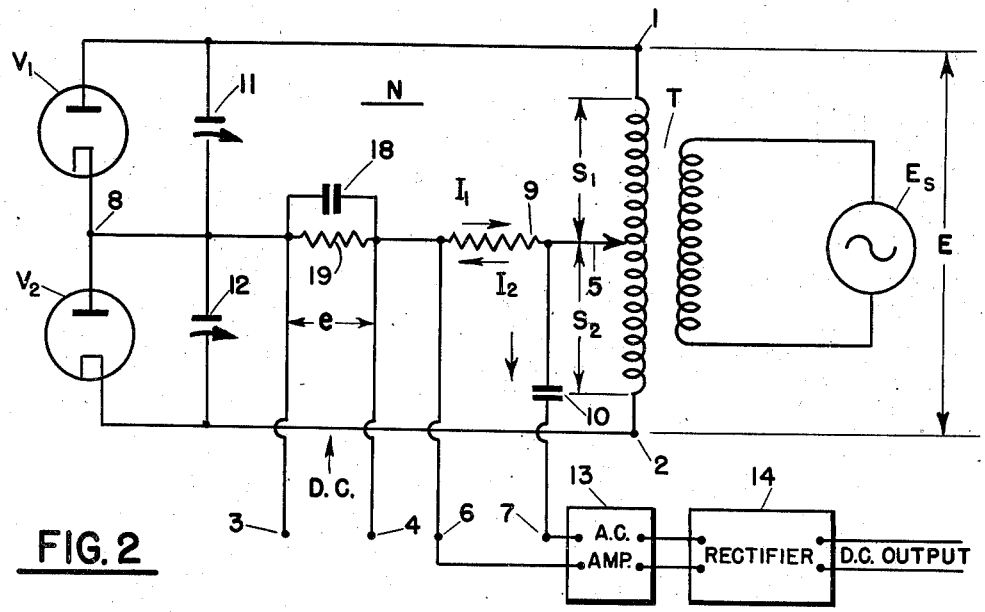
Figure 2 is a circuit diagram of a direct-current amplifier incorporating a bridge-circuit modulator.

All of these difficulties are substantially eliminated by recourse to the system shown in Figure 2 which comprises the bridge circuit N, two of whose balancing arms include the asymmetric conductors, preferably diodes, $V_1$ and $V_2$. The other two balancing arms include the secondary winding sections $S_1$, $S_2$ of transformer T, or as in Figure 1, the sections $S_1$, $S_2$ of potentiometer R.

Upon the input terminals 1, 2 of the bridge is impressed an alternating voltage of desired frequency, for convenience in some cases 60 cycles per second. With null input voltage applied to its terminals, 3, 4, the bridge is balanced, as by adjustment of contact 5, so that no alternating voltage appears between output terminals 6, 7 of the bridge. Under this condition of balance, the tubes $V_1$ and $V_2$ are simultaneously conductive during positive half cycles of the alternating voltage E impressed on the input terminals 1, 2. As the periods of conduction for the tubes are equal when the bridge is balanced, the currents $I_1$ and $I_2$ traversing tubes $V_1$ and $V_2$ respectively mutually cancel in that arm of the bridge between points 5 and 8.

Assuming, however, that a direct-current voltage $e$ is applied to input terminals 3, 4 with, for example, the negative terminal of the source connected to terminal 3, the anode of diode V—1 is for each cycle of voltage E positive with respect to its cathode longer than the anode of diode $V_2$ is positive with respect to its cathode. Consequently, the difference between the magnitudes of currents $I_1$ and $I_2$ is no longer zero and for positive half-waves of voltage E, the output impedance 9 is traversed by pulsing unbalanced current, which is unidirectional, of polarity dependant upon poling of the source of voltage $e$, and of magnitude which is a function of the magnitude of voltage $e$.

Although most diodes have approximately a second-power or square-law response for small applied voltage, the input/output characteristic may be made to approach linearity by use of a high series resistance. Accordingly, the bridge N may be made to have an output substantially directly proportional to input by employing a resistance 9 of substantially high magnitude.

With linear operation, the alternating voltage at terminals 6, 7 is approximately of square wave form having a peak to peak amplitude approximately equal to the direct-current voltage $e$ provided the magnitude of $e$ is small relative to the magnitude of the alternating-current input voltage E and neglecting the so-called "contact potential" of the diodes which tends to make the wave form depart from a square though it still remains substantially rectangular. The foregoing is more readily understood if it is recalled that when the anode to cathode voltages of the tubes are negative, no current flows through resistor 9, whereas, when those voltages are positive, each diode passes a current proportional to the impressed voltage. That is $$I_1 = k_1\left(\frac{E}{2} + e\right)$$

$$I_2 = k_2\left(\frac{E}{2} - e\right)$$

(The factors $k_1$ and $k_2$ are equal if the rectifiers are reasonably well matched and resistance 9 is of suitably large magnitude.) Consequently $$I_1 - I_2 = kE$$

and the wave has a flat top during most of the conducting portion of the cycle. It is not strictly so because, due to the direct-current unbalancing voltage, there are times when only one rectifier is conductive.

Figure 1:
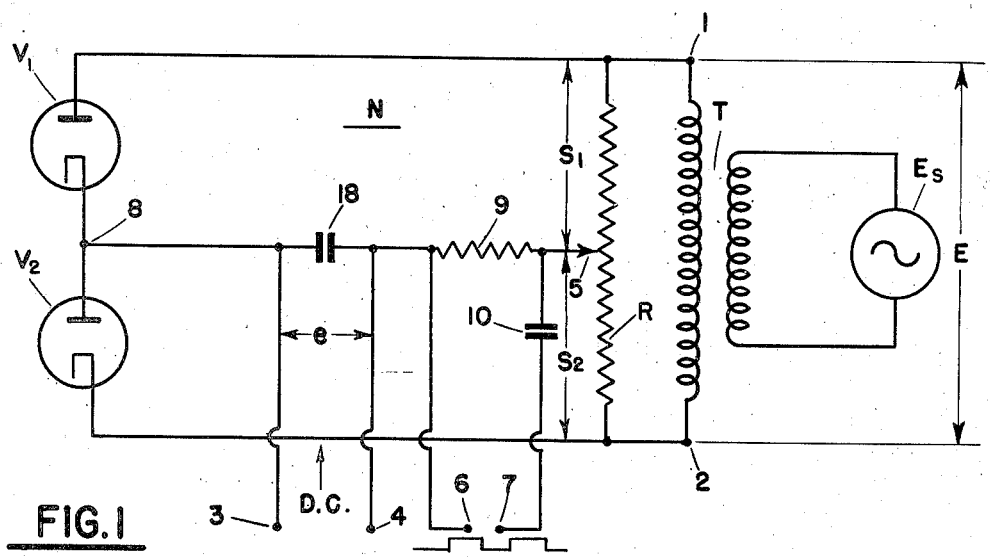
Figure 1 is a circuit diagram of a square-wave generator utilizing a modification of the modulator shown in Figure 2.

Accordingly, the network N may be used, as in Figure 1, to generate square waves by application of a sine-wave voltage, for example, to input terminals 1, 2 and a steady or unmodulated direct-current voltage to input terminals 3, 4 so avoiding need for a multi-vibrator or other similar relatively complicated oscillator. For generation of square waves, the voltage E should be large, for example, 200 volts, and the voltage $e$ should be relatively small, for example 5 volts.

When the bridge is to be used as the input end of a direct-current amplifier system, as in Figure 2, the alternating input voltage E should be small, for example, of the order of a volt, although still much larger than the direct-current input voltage $e$ to avoid non-linearity of response.

The initial balancing of the bridge N in Figure 2, or any of the modifications, may be improved or facilitated by the variable condensers 11, 12 connected in shunt to the rectifiers $V_1$, $V_2$.

The blocking condenser 10 may be used to prevent the direct-current voltage across resistor 9 from appearing at output terminals 6 and 7. Condenser 18 is provided to afford a path of relatively low impedance to currents of frequency of source 3. Resistance 19 represents the resistance of the source of voltage $e$ or is a physical resistor in shunt to that source.

The output voltage of the bridge N is applied to the amplifier 13 which may be a conventional audio-frequency or radio-frequency amplifier, depending upon the frequency of input voltage E, which may be tuned or tunable to the operating frequency. The output of the amplifier 13 may be rectified by any suitable rectifier 14 to afford a direct-current output which by proper selection of circuit components may be made substantially proportional to the direct-current input voltage $e$.

Figure 3:
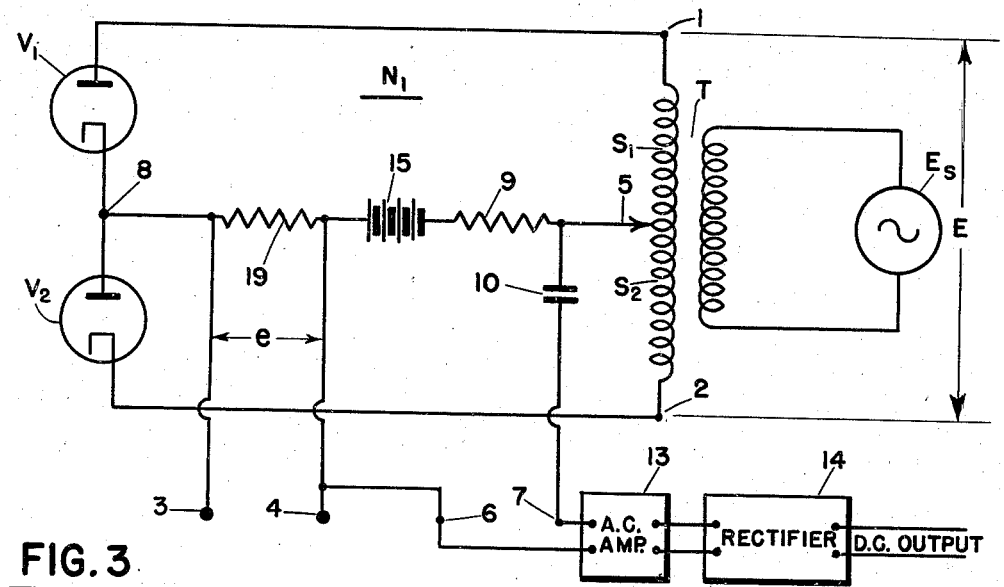
Figure 3 is a circuit diagram of another modification of the bridge circuit shown in Figure 2.

With the bridge N of the Figure 2, the envelope of the alternating-current output is not a true reproduction of the input voltage $e$ when that voltage has as alternating current component whose peak value exceeds the direct current voltage. To adapt the network for use with an oscilloscope for analysis of the wave form of voltages having both alternating and direct current components, even when the alternating current component is the greater of the two, and for other uses such as replacement of direct-current control amplifiers, amplidynes, zero-beat indicator amplifiers, vacuum tube voltmeters and the like, there is included in arms 5—8 of the bridge a battery 15 as shown in Figure 3 or other source of direct-current voltage at least equal to the peak value of input voltage $e$.

The insertion of the battery 15 or equivalent unbalances the bridge so that for zero magnitude of voltage $e$ there is alternating current output from the bridge. The application of voltage $e$ will, therefore, increase or decrease that alternating output voltage at terminals 6, 7, in dependence upon the instantaneous polarity of voltage $e$, as the unbalance of the bridge is increased or decreased. Provided the circuit parameters are selected to obtain linear operation, the envelope of the output voltage will closely approximate the shape of voltage $e$, as determined by its alternating and direct-current components. The alternating current output may be amplified by a conventional audio or radio-frequency amplifier 13, the output of which, when rectified, affords an amplified voltage having the same wave shape as voltage $e$.

For such uses, the frequency of the input alternating-current voltage E should be considerably higher than the highest frequency component of input voltage $e$ which is to be amplified. Amplifier 13, therefore, should be suited for amplification of frequencies centered at the frequency of input voltage E and extending throughout a band at least twice as wide as the highest frequency component of input voltage $e$. Use of a tuned amplifier will change the wave shape from a square wave to one approximately sinusoidal with possible greater departure from linearity of the modulation.

Amplifier 13 should be designed to discriminate against the modulation frequencies comprised in the input signal voltage $e$ or a filter may be included between impedance 9 and output terminals 6, 7 to suppress those frequencies.

When the system of Figure 3 is to be used for amplification of an extremely small voltage $e$, it is desirable to use one or more stages of conventional direct-current amplification in advance of bridge N to maintain a suitably high ratio of signal to noise and to facilitate initial setting of bridge balance.

As apparent from the foregoing discussion, the bridge system described may be used as a modulator having the advantage that only a very small input voltage $e$ is required to obtain 100 per cent modulation without requiring use of the usual master-oscillator power-amplifier arrangement. It may, therefore, be used in signal generators and other circuits requiring high percentage of modulation and maximum circuit simplicity: source $E_s$ in such case provides the radio-frequency input voltage and the lower frequency modulating voltage is applied to input terminals 3, 4. For use of the system as a detector, the signal is applied to the input terminals 3, 4 (or 1, 2) and the oscillator voltage is applied to input terminals 1, 2 (or 3, 4). Because the bridge is used under conditions of at least approximate balance, the systems have the advantage that little if any of the oscillator voltage is fed back into the modulator input system.

For at least some uses of any of the preceding modifications, the diodes $V_1$, $V_2$ may be replaced by crystal rectifiers or other types of asymmetric conductors.

Figure 4:
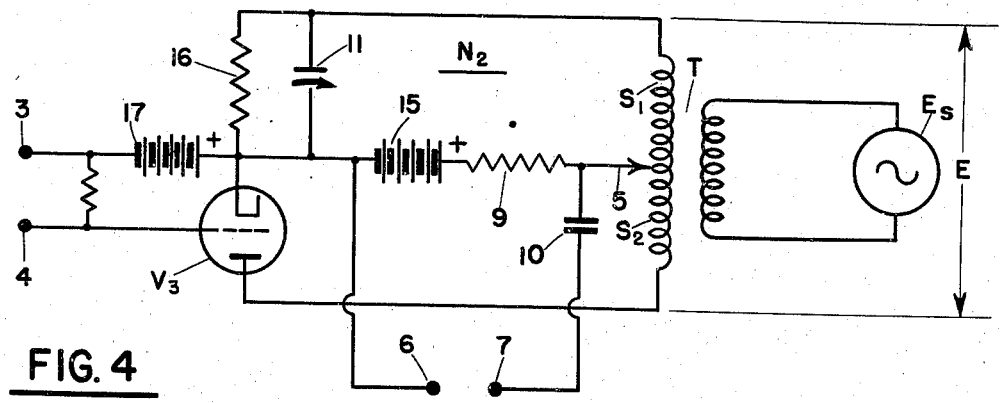
Figure 4 is a circuit diagram of a modulator circuit embodying another modification of the bridge circuit shown in Figure 2.

In the modification shown in Figure 4, which may also be used as the input system of a direct-current amplifier or for modulation or detention purposes, the diodes $V_1$, $V_2$ are replaced as balancing arms of the bridge by resistor 16 and amplifier tube $V_3$ shown for simplicity as a triode, but which may be any multi-electrode type having a control electrode. The variable condenser 11 may be included to facilitate balancing of the bridge N2 which in this modification need not have a one to one ratio of the balancing arms. In initial balancing of the bridge, contact 5 may be adjusted as in Figures 1 or 2, or the grid-biasing potential of tube $V_3$ as afforded by battery 17 or other source of direct-current may be varied. As in preceding modifications, the bridge N2 may, for use as a direct-current amplifier, be initially balanced for null input but should be to a suitable extent initially unbalanced at null input if the input signal has a relatively large alternating current component. The output of the bridge, as in preceding modifications, may be fed to an amplifier whose output is rectified.

While for purposes of explanation I have described various embodiments thereof, it is to be understood my invention is not limited thereto but is coextensive in scope with the appended claims.

The invention described herein may be manufactured and used by or for the Government of the United States of America for governmental purposes without the payment of any royalties thereon or therefor.

What I claim is:

1. In a bridge circuit, a source of alternating current, a first pair of impedance arms connected across said source and conductive during the full cycle, a second pair of arms connected across said source comprising asymmetric conductors in series and poled to be concurrently conductive during only one half cycle of the source, a conductive connection extending from a point between said first pair of arms to a point between said second pair of arms, and an input element and an output element connected in series in said conductive connection.

2. The bridge circuit of claim 1 in which the input element has a variable direct current source connected across it.

3. The bridge circuit of claim 1 in which said point between the first pair of arms is adjustable.

4. The bridge circuit of claim 1 in which each arm of said second pair of arms is provided with a variable condenser connected thereacross.

5. The bridge circuit of claim 1 in which said conductive connection includes a fixed direct current source in series with said output element.

6. The bridge circuit of claim 1 in which said first pair of arms comprises secondary windings of a transformer.

7. The bridge circuit of claim 1 in which the output element has a much higher impedance than said asymmetric conductors.

JOHN M. MILLER, Jr.

REFERENCES CITED

The following references are of record in the file of this patent:

UNITED STATES PATENTS

| Number | Name | Date |
| --- | --- | --- |
| 2,120,882 | Ballantine | June 14, 1938 |
| 2,163,707 | Schaffstein | June 27, 1939 |
| 2,250,284 | Wendt | July 22, 1941 |